July 23, 1935.   J. T. NICHOLS   2,008,793
TEMPERATURE MEASURING
Filed July 17, 1933
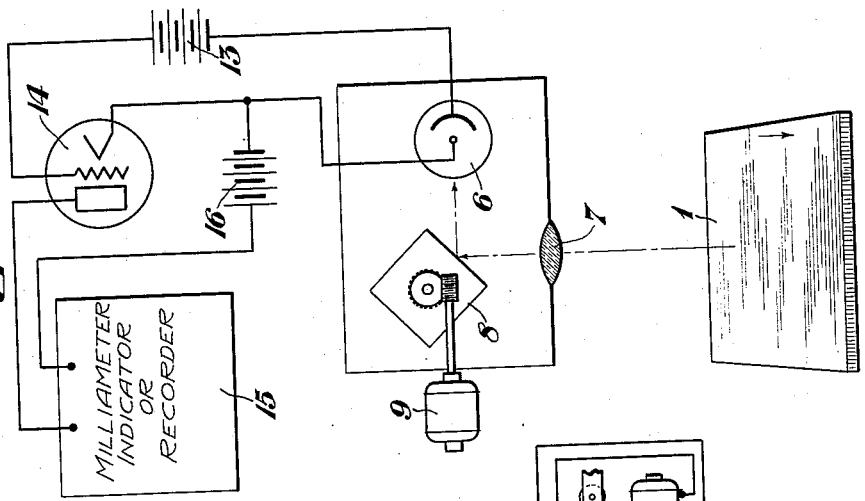
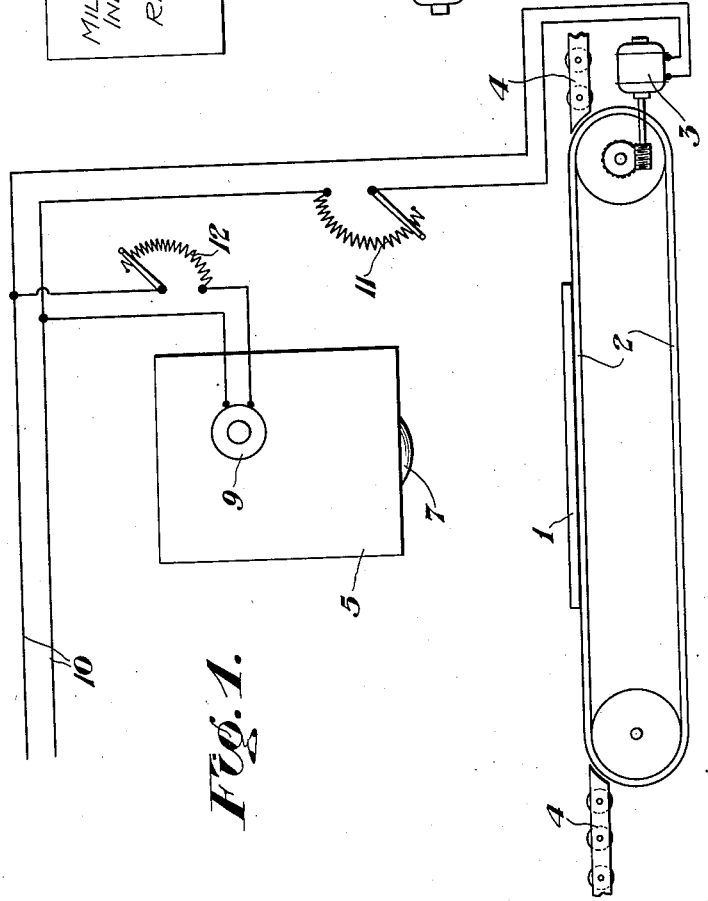
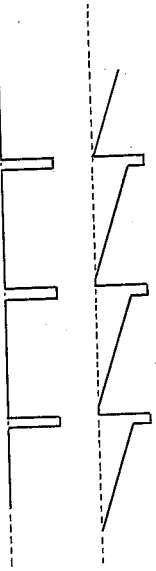
Inventor:
JOHN T. NICHOLS,
by: Msina + Rauber
his Attorneys.

Patented July 23, 1935

2,008,793

UNITED STATES PATENT OFFICE 2,008,793

TEMPERATURE MEASURING

John T. Nichols, Pittsburgh, Pa.

Application July 17, 1933, Serial No. 680,888

3 Claims. (Cl. 73—32)

This invention is an apparatus for indicating temperature variations of a work-piece. It may be used in connection with the rolling of relatively wide work to indicate the uniformity with which it is being heated so that the operation of the heating or reheating furnace may be checked. As it indicates temperature variations throughout a work-piece it may also be used to time the operation of a flying shear cutting continuously moving strip, because it provides a means for indicating the moment the ragged portions of the strips terminate and the solid portions commence. Other uses and advantages may be inferred.

The accompanying diagram illustrates a specific example of the invention, the various figures being as follows:

Figure 1, a side view;

Figure 2, an end view which also schematically shows the details of this particular example; and Figures 3 and 4 representative examples of the results obtained.

Referring to the above, a work-piece 1 is moved by an endless conveyer 2 powered by a motor 3. This conveyer may be interposed in a conventional roller conveyer 4 such as is used in a sheet mill, it being assumed that the work-piece is a sheet bar or pack, although it might be any relatively wide piece.

A box 5 is arranged above the conveyer 2, whereby the work-piece 1 is moved past it. This box contains a photometrically operated pyrometer. According to the invention, this pyrometer is such that it reads the temperature of the piece 1 from side to side during the latter's movement by the conveyer 2.

Accordingly, the box 5 may contain a photoelectric unit 6 onto which light from the work-piece 1 is transmitted by a lens 7 and a reflector 8. That is to say, light from the piece 1 passes through the lens 7, is reflected by the reflector 8 and is received by the photoelectric unit 6.

The reflector 8 is constructed and arranged to transversely scan the work-piece 1. It is illustrated as a four-sided reflector revolved by a motor 9. The motors 3 and 9 may be energized by power lines 10 through variable resistances 11 and 12, whereby their speeds may be corelated. In some instances it may be desirable to use synchronous motors properly geared and constructed to obtain any desired speed ratio between the reflector 8 and the work-piece 1.

A battery 13 energizes the unit 6, the latter controlling the grid of a three-element tube 14 which, in turn, controls a milliammeter indicator or recorder 15 which is energized by a battery 16. The arrangement here mentioned is conventional and may be substituted by any other providing a measurement of the photoelectric unit's varying conductivity as effected by varying temperatures of the work-piece 1.

Assuming the instrument 15 to be a recorder which is suitably calibrated to plot the current variations in temperature and that the work-piece 1 is of an absolutely uniform temperature, a result somewhat like that suggested by Figure 3 may be expected. It is to be observed that the temperature reading is practically flat along a line which it may be presumed to represent the temperature desired. The portions which drop downwardly and then rise abruptly are caused by the reflector rotating past a point where it has completely scanned the work-piece and is ready to scan a new portion which has been brought forwardly by the conveyer 2. Figure 4 is representative of what may be expected if one side of the piece is cooler than the other, the recorder's reading showing a progressive drop.

It is not deemed necessary to specify any certain co-relation of the reflector and conveyer speeds because this will depend entirely upon the accuracy desired, the capacity of the instrument 15, the character of the work-piece and other variables. Of course, it is necessary that the speeds be proportioned to produce understandable readings.

In the continuous strip cutting application previously mentioned, the box 5 may be arranged above the passage of a strip as it leaves its rolling mill so as to transversely scan the same. As the usual ragged end approaches, readings of a variable nature will, of course, result. As soon as the readings indicate a reasonably uniform temperature, the shear may be operated.

I claim:

1. Apparatus for indicating temperature variations of a work-piece, including the combination of a photometrically operated pyrometer and a movable light deflector constructed and arranged to transmit rays from different portions of a work-piece to said pyrometer.

2. Apparatus for indicating temperature variations of a work-piece, including the combination of a photometrically operated pyrometer, means for moving a work-piece past said pyrometer, and a light deflector constructed and arranged to transversely scan the work-piece and to deflect rays emitting therefrom to said pyrometer.

3. Apparatus for indicating temperature variations of a work-piece, including the combination of a photoelectric unit, means for moving a work-piece past said unit, a light deflector constructed and arranged to transversely scan a work-piece moved by said means, means for energizing said unit and indicating means operable by current variations through said unit.

JOHN T. NICHOLS.